United States Patent [19]

Shibata et al.

[11] Patent Number: 5,498,306

[45] Date of Patent: Mar. 12, 1996

[54] METHOD AND APPARATUS FOR MANUFACTURING INK JET RECORDING HEAD

[75] Inventors: Makoto Shibata; Hitoshi Itoh, both of Yokohama, Japan

[73] Assignee: Canon Kabushiki Kaisha, Tokyo, Japan

[21] Appl. No.: 275,743

[22] Filed: Jul. 19, 1994

Related U.S. Application Data

[63] Continuation of Ser. No. 868,646, Apr. 15, 1992, abandoned.

[30] Foreign Application Priority Data

Apr. 16, 1991 [JP] Japan ..................... 3-109536

[51] Int. Cl.⁶ .................... B32B 31/04; B32B 31/20; B32B 31/28; B32B 35/00
[52] U.S. Cl. .................... 156/275.3; 156/292; 156/275.1; 156/275.7; 156/379.8; 156/581
[58] Field of Search ............... 156/273.7, 275.1, 156/275.5, 275.7, 306.3, 379.6, 379.8, 580, 581, 582, 583.91, 292, 275.3; 346/140 R

[56] References Cited

U.S. PATENT DOCUMENTS

| | | |
|---|---|---|
| 4,313,124 | 1/1982 | Hara . |
| 4,345,262 | 8/1982 | Shirato et al. . |
| 4,394,670 | 7/1983 | Sugitani et al. . |
| 4,417,251 | 11/1983 | Sugitani . |
| 4,459,600 | 7/1984 | Sato et al. . |
| 4,463,359 | 7/1984 | Ayata et al. . |
| 4,521,787 | 6/1985 | Yokota et al. . |
| 4,558,333 | 12/1985 | Sugitani et al. . |
| 4,686,544 | 8/1987 | Ikeda et al. . |
| 4,723,129 | 2/1988 | Endo et al. . |
| 4,740,796 | 4/1988 | Endo et al. . |
| 4,819,014 | 4/1989 | Yasuhara et al. . |
| 5,171,392 | 12/1992 | Iida et al. ............. 156/275.5 X |

FOREIGN PATENT DOCUMENTS

| | | |
|---|---|---|
| 0063637 | 8/1983 | European Pat. Off. . |
| 54-056847 | 5/1979 | Japan . |
| 59-123670 | 7/1984 | Japan . |
| 59-138461 | 8/1984 | Japan . |
| 60-071260 | 4/1985 | Japan . |

OTHER PUBLICATIONS

Hewlett–Packard Journal, Boeller et al., "High–Volume Microassembly of Color Thermal Inkjet Printheads and Cartridges", pp. 32–40, Aug. 1988.

*Primary Examiner*—David A. Simmons
*Assistant Examiner*—M. Curtis Mayes
*Attorney, Agent, or Firm*—Fitzpatrick, Cella, Harper & Scinto

[57] ABSTRACT

The present invention relates to an ink jet head manufacturing method including a pressurizing step for forming liquid passages communicating with discharge openings for discharging ink, by pressurizing to bond a base member and a top member together via wall members defining the liquid passages, except for areas where the liquid passages are formed. The present invention further provides an apparatus for carrying out such ink jet head manufacturing method.

23 Claims, 7 Drawing Sheets

METHOD AND APPARATUS FOR MANUFACTURING INK JET RECORDING HEAD

This application is a continuation of application Ser. No. 07/868,646 filed Apr. 15, 1992, now abandoned.

BACKGROUND OF THE INVENTION

1. Field of the Invention

The present invention relates to a method for manufacturing an ink jet head for forming liquid droplets by discharging recording liquid by utilizing an ink jet recording technique, and more particularly, it relates to a method and apparatus for bonding a top member to a base member via wall members for defining ink passages therein, in the manufacture of a plurality of ink jet heads collectively.

2. Related Background Art

Figure 4:
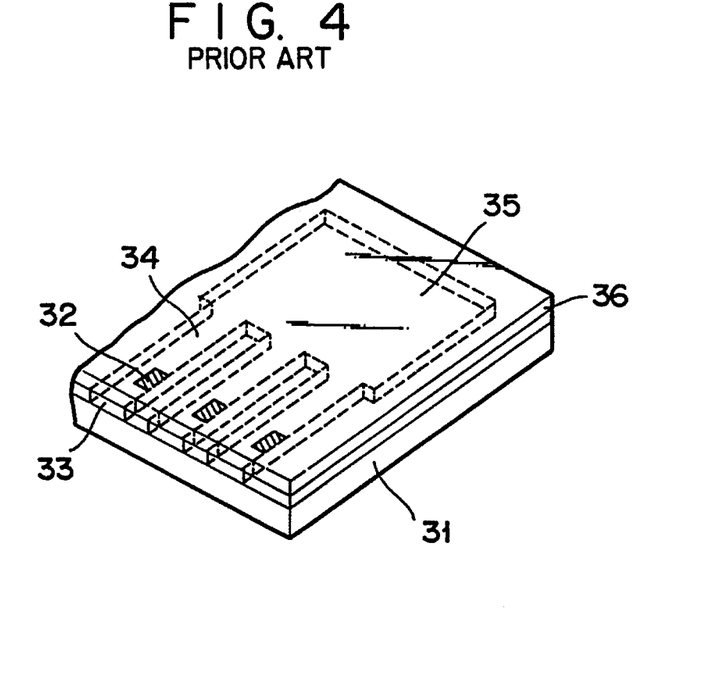
FIG. 4 is a perspective view of an ink jet head.

As shown in FIG. 4, in an ink jet head used with ink jet recording systems (liquid jet recording systems), a base member is formed by arranging a predetermined number (three in FIG. 4) of energy generators (for example, electrothermal conversion members) 32 for generating energy used to discharge ink on a support plate 31 made of silicon and the like, and a pattern corresponding to discharge openings 33, ink passages 34 and a common ink chamber 35 is formed by the lithographic technique to obtain such discharge openings, ink passages and ink chamber, and a top member 36 is covered on the formed pattern, thus manufacturing the ink jet head. Conventionally, in order to bond the top member 36 to the base member, an adhesive capable of being softened by the illumination of ultraviolet ray (UV) was coated on one surface of the top member 36, the top member was positioned with respect to the base member on which the pattern was formed, the top and base members were abutted against each other with an appropriate pressure, and then the adhesive was cured by illuminating the ultraviolet ray thereon, thus adhering both members to each other. The pressure for bonding these members to each other can be obtained by rollers (FIG. 5) or a press for applying the pressure to the parallel members (FIG. 6).

Figure 5:
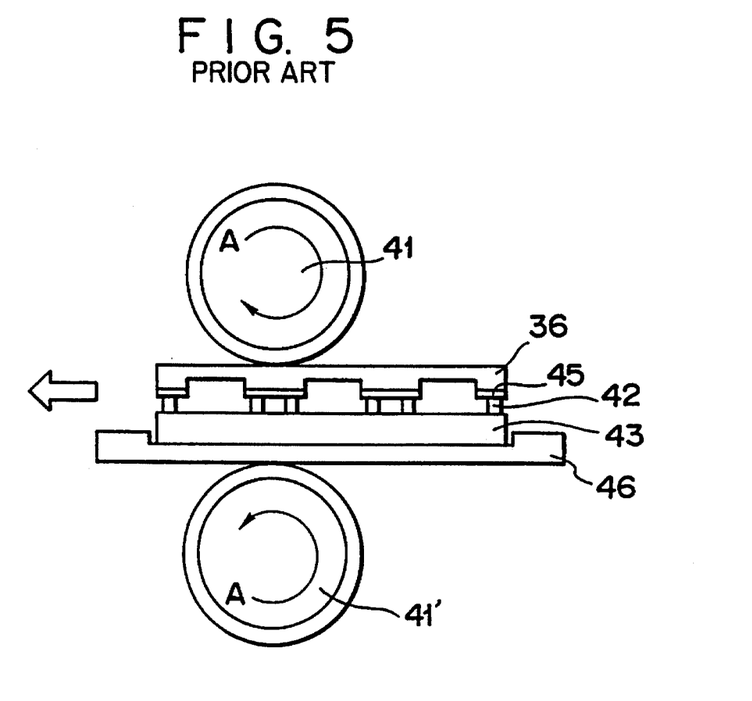
FIG. 5 is an elevational sectional view showing an example of a conventional method for bonding a top member to a base member including a side wall pattern.
Figure 6:
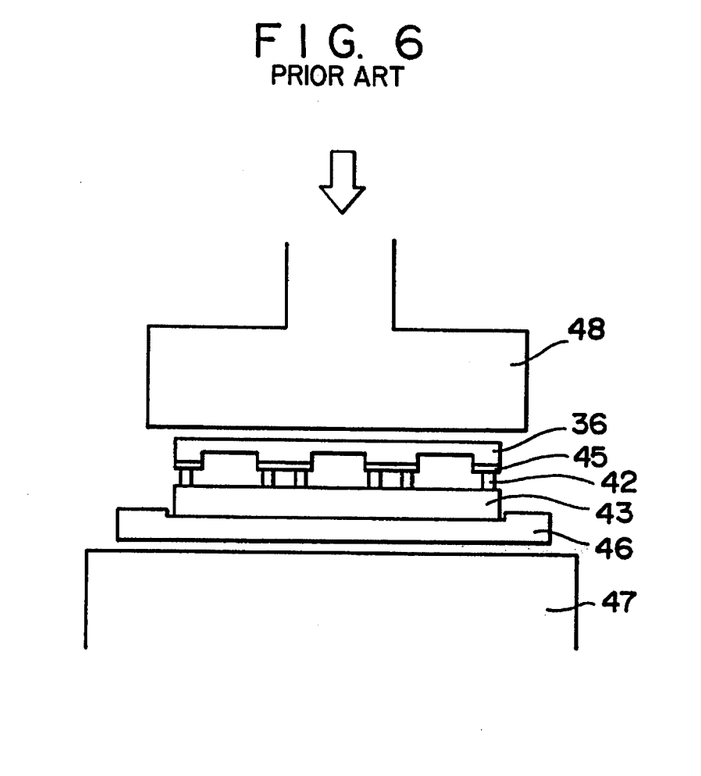
FIG. 6 is an elevational sectional view showing an example of another conventional method for bonding a top member to a base member including a side wall pattern.

In the case where the pressure is obtained by the rollers, as shown in FIG. 5, the top member 36 and the base member 43 with the interposition of wall members 42 defining ink passages communicating with discharge openings are passed between and pressed by pressure rollers 41, 41' rotated in directions shown by the arrows A. Incidentally, the reference numeral 45 denotes an adhesive layer for adhering the wall members 42 to the top member 36; and 46 denotes a work support on which the base member 43 and the top member 36 are rested and which can be used at need.

When such rollers are used to pressurize the members against each other, it is feared that the following problems arise:

(1) When the base member and the top member (which constitutes a "work") positioned with respect to each other are inserted between the rollers, if one of the members is contacted with the roller, the discrepancy in the relative position between the base member and the top member will occur.

(2) If hard rollers are used, the penetrating amount of the wall members into the adhesive layer will be non-uniform or uneven due to the dispersion in the thickness accuracy of the work and/or work support, which results in the dispersion in positions of the discharge openings in height direction. Thus, the dimensions of the discharge openings do not become constant or uniform. Further, if any hard foreign matter exists between the adhesive layer and the wall member and/or top member, the dispersion in the dimensions of the discharge openings will be further increased.

Figure 7:
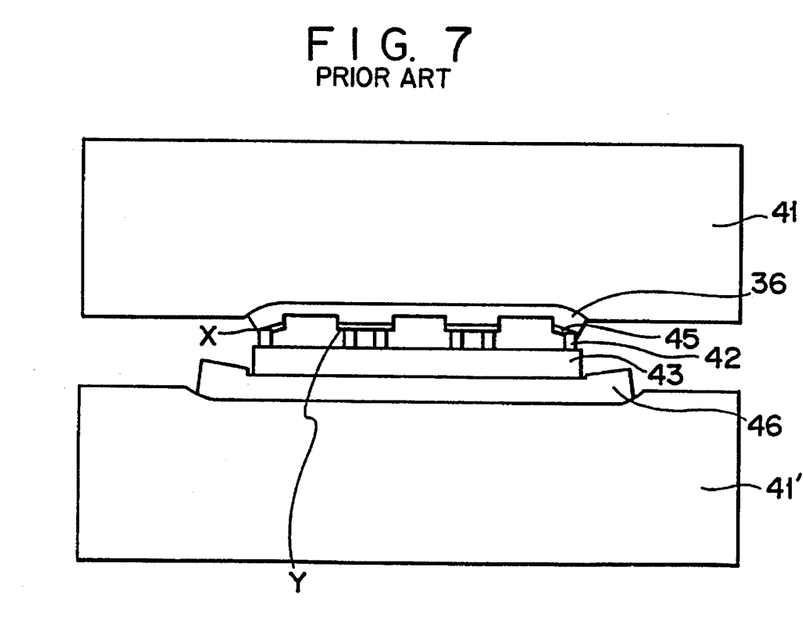
FIG. 7 is an elevational sectional view showing a condition that a top member and a base member are bonded together by using soft rollers.

(3) If the rollers covered by soft rubber layers are used, since the surfaces of the rollers are soft, as shown in FIG. 7, the dispersion (as shown X, Y in FIG. 7) in the penetrating amount of the wall members 42 into the adhesive layer 45 will occur due to the deformation of the rollers, with the result that the dimensions of the discharge openings do not become constant or uniform.

On the other hand, when the press is used to pressurize the members against each other by pressing the work rested on a press platform 47 by a pressure member 48 as shown in FIG. 6, it is feared that the following problems arise:

(4) Due to the dispersion in the thickness accuracy of the work and/or work support 46, unevenness in the press surfaces, and/or unparallelism between the upper and lower surfaces of the press, the same problem as mentioned in the above Item (2) occurs.

Figure 8:
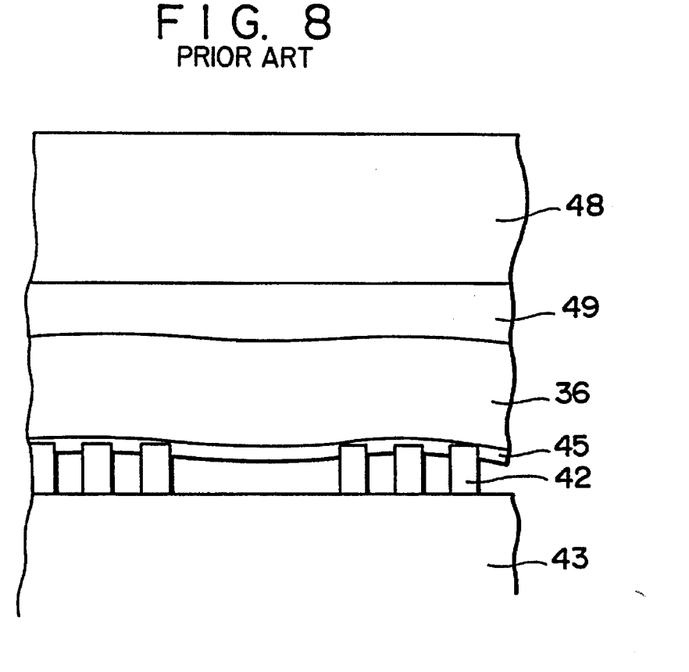
FIG. 8 is an elevational sectional view showing a condition that a top member and a base member are bonded together by pressurization with the interposition of a flat rubber layer.

(5) If an elastic flat plate 49 is interposed between the pressure member 48 and the top member 36, as shown in FIG. 8, since the pressure value per a unit area is varied between regions where there are greater portions (wall members and the like) to be adhered and regions where there are less portions to be adhered, the dispersion in the penetrating amount into the adhesive layer will occur, with the result that the dimensions of the discharge openings do not become constant or uniform.

(6) If the parallelism of the press is insufficient, since the pressure member of the press initially contacts with the top member locally, the relative position between the top member and the base member will be changed during the operation of the press.

Further, after the adhesion, the adhered work is dismounted from the press and the adhesive layer is cured. In this case, it is feared that the adhesive layer is separated unless the temperature of the adhesive is lowered to a room temperature level to increase the viscosity of the adhesive during the dismounting of the work and the ultraviolet rays are illuminated onto the adhesive layer immediately after the dismounting of the work, because, due to the fact that the viscosity of the adhesive is reduced to facilitate the adhesion by increasing the temperature during the adhesion process, if the coefficient of thermal expansion of the base member (for example, made of silicone wafer) differs from that of the top member (for example, made of glass), the camber will occur during the cooling of the members, thus causing the separation of the adhesive layer.

SUMMARY OF THE INVENTION

The present invention aims to eliminate the aforementioned conventional drawbacks, and an object of the present invention is to provide a method and apparatus for manufacturing an ink jet head, wherein an ink jet head is manufactured by bonding a top member to a base member including wall members for defining ink passages and the like, and the which facilitates the positioning between the base member and the top member and ensures the bonding therebetween and can manufacture a plurality of heads collectively.

In order to achieve the above object, according to a preferred embodiment of the present invention, the following features are provided:

(a) The top member is temporarily adhered to the base member at plural peripheral points thereof with a two liquid component instantaneous adhesive in order to prevent the discrepancy in the relative position between the top and base members in subsequent processes or steps after they are bonded together.

(b) A heating/cooling means is provided in a press, so that the adhesive is heated during the bonding to reduce the viscosity of the adhesive, thereby facilitating the bonding between the top member and the base member and that the adhesive is cooled after the bonding to increase the viscosity of the adhesive, thereby effectively preventing the camber of the member(s) due to the difference in the coefficient of thermal expansion between the members and the resulting separation therebetween.

Figure 9:
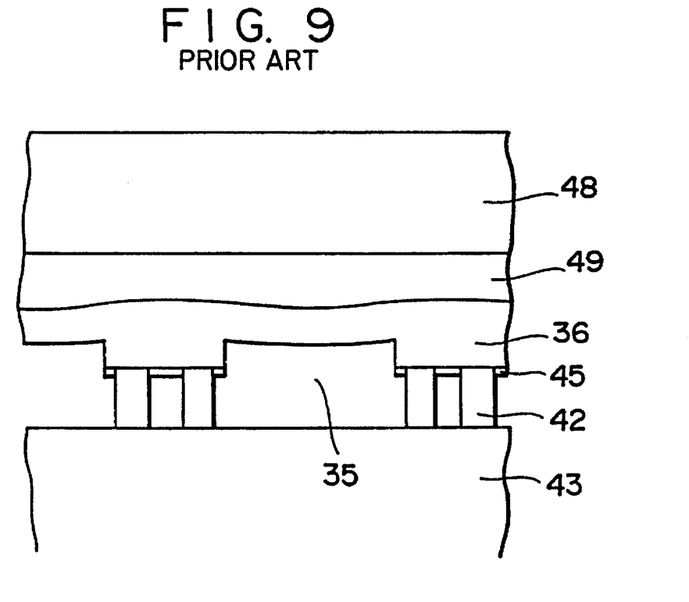
FIG. 9 is a partial elevational sectional view showing a condition that a top member and a base member are bonded together by pressurization by means of a pressurizing tool having no recessed portions.

(c) Recessed portions corresponding to the wall members defining the ink passages and wall portions defining common ink chambers are formed in a pressure member of the press so that only the wall members and the wall portions are pressurized by the press during the bonding between the top member and the base member. That is to say, if there is no such recessed portions, thinner wall portions of the top member directly opposing the ink chambers are also pressurized by the pressure member, with the result that the top member is distorted as shown in FIG. 9. The distortion of the top member will cause the difference in the penetrating amount of the wall members defining the ink passages and the wall portions defining the ink chambers into the adhesive. Further, by interposing a thin elastic layer such as a rubber layer between the work and the pressure member of the press, the uneven pressure generated due to the dispersion in the thickness of the work and the pressure member and/or the parallelism between the work and the pressure member and acting on the work can be compensated.

(d) In order to prevent the top member and the base member from distorting after the bonding therebetween, the work is cooled by the above-mentioned cooling means while they are being pressurized after adhesion, thus releasing the stress due to the thermal expansion of the members. Thereafter, the adhesive layer is cured by illuminating the ultraviolet rays thereon. To this end, the pressure member and at least one of the base member and the top member are made of UV permeable material.

More particularly, the present invention includes a pressurizing step for forming ink passages communicating with discharge openings for discharging ink by pressurizing and bonding the base member and the top member together substantially except for regions where the ink passages are formed, during the bonding between the base member and the top member via the wall members defining the ink passages. Further, the present invention has the following features: that is, recessed portions corresponding to the regions where the ink passages are formed in the pressure member for performing the pressurization; the pressurization is effected via an elastic thin film or layer disposed between the pressure member and an element to be pressurized; the elastic thin layer has the hardness of 40–85 degrees obtained by an A-type hardness tester of K6301 spring type in the Japanese Industrial Standard (JIS), and has a thickness of 0.2–1 mm; the bonding is effected by the adhesive layer capable of being cured by the illumination of the ultraviolet rays and disposed between the top member and the wall members; such ultraviolet ray cured adhesive layer has a thickness of 1–5 μm; the pressure member for performing the pressurization is permeable to the ultraviolet rays; after the pressurization, a curing step for curing the ultraviolet ray cured adhesive layer by illuminating the ultraviolet ray thereon is included; both the base member and the top member are plate-shaped; the pressurization is effected while heating; the heating is effected before the pressurization; before the pressurization step, a temporary adhesion step for temporarily adhering the top member to the wall members defining the ink passages at plural points around the ink passages is included; the temporary adhesion is effected by using a two liquid component elastic adhesive; a cooling step for cooling the element to be pressurized while pressurizing such element is included; the ink passages include a plurality of ink paths communicating with corresponding discharge openings and with common ink chambers, and recesses corresponding to the ink chambers are formed in an inner wall of the top member; energy generators for generating energy utilized to discharge the ink from the discharge openings are disposed in the ink passages; the energy generators comprise electrothermal conversion members for generating thermal energy as the aforementioned energy; a plurality of discharge openings are arranged along a whole width of a recording sheet on which an image is recorded by the ink discharged from the discharge openings; and a separating step for separating the manufactured ink head assembly into individual ink jet head units after the pressurization step is included.

Further, the present invention relates to an apparatus for manufacturing an ink jet head, comprising a pressure member for forming ink passages communicating with discharge openings for discharging ink, by bonding a top member to a base member, substantially except for regions where the ink passages are formed, via wall members for defining such ink passages. The apparatus is characterized in that recessed portions corresponding to the regions where the ink passages are formed in the pressure member, and it includes a temperature adjusting means for adjusting the temperatures of the top member and the base member via the pressure member, and that the bonding between the top member and the base member is effected with the interposition of the ultraviolet ray cured adhesive layer and the pressure member is permeable to the ultraviolet rays, and an ultraviolet ray lighting means for illuminating the ultraviolet rays onto the ultraviolet ray curable adhesive via the pressure member is provided.

BRIEF DESCRIPTION OF THE DRAWINGS

Of FIGS. 2A to 2C, FIG. 2B-1 is a partial plan view of the pressurizing tool, FIG. 2B-2 is a sectional view taken along the line II—II in FIG. 2B-1 and FIG. 2C is a partial plan view of an alteration of a pressurizing tool used in the manufacturing method of the present invention;

DETAILED DESCRIPTION OF THE PREFERRED EMBODIMENTS

The present invention will now be explained in connection with embodiment thereof with an reference to the accompanying drawings.

Figure 1A:
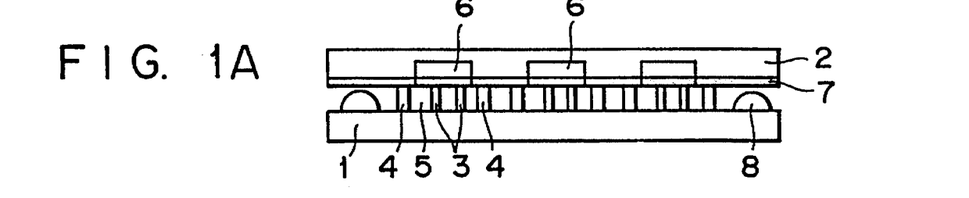
FIGS. 1A to 1C are explanatory views showing an example of manufacturing steps of an ink jet head manufacturing method according to the present invention.
Figure 1B:
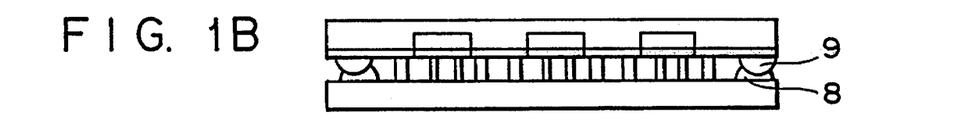
Figure 1C:
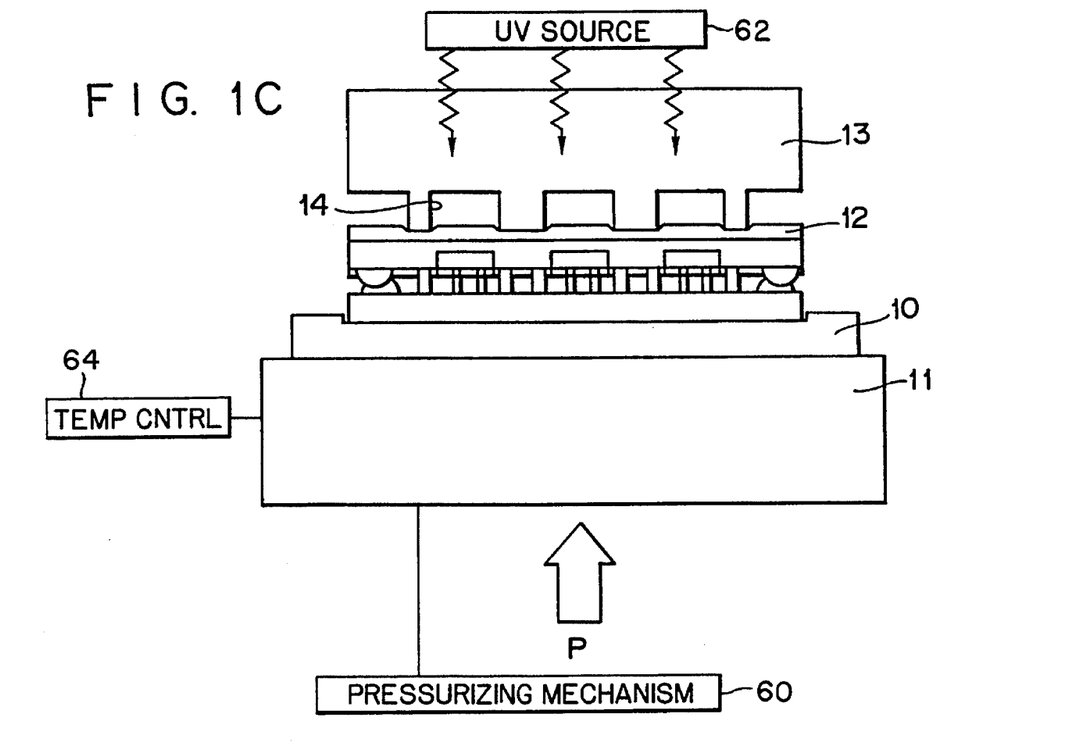

FIGS. 1A to 1C show steps for bonding a top member to a base member on which wall members defining ink passages are formed, in the ink jet head manufacturing method according to the present invention.

FIG. 1A shows a positioning step for positioning a base member 1 and a top member 2 with respect to each other before they are bonded together. That is to say, the base member 1 is made of silicon and the like. Energy generators (not shown), and wall members 3 for defining ink passages and wall portions 4 for defining ink chamber which are made of photosensitive resin are formed on the base member 1. The photosensitive resins may be any one of resins disclosed in U.S. Pat. No. 4,417,251. The top member 2 is made of material permeable to ultraviolet rays (UV) such as glass and is provided with recesses 6 in correspondence to positions of the ink chambers, for increasing heights of the ink chambers higher than those of the ink passages 5. An UV curable adhesive layer (i.e., adhesive layer capable of being cured by the ultraviolet rays) 7 is coated on the top member 2 except for the recesses 6. For example, by using a roll coater, the adhesive layer 7 can be selectively formed on the top member except for the recesses 6. The adhesive used to form the adhesive layer 7 is preferably an UV curable adhesive which can be easily cured for a short time by illuminating the ultraviolet rays thereon after the bonding between the top member and the base member. Preferably, the adhesive material is NOPCOCURE CPA-4 or NOPCO-CURE CPA-5 manufactured by SANNOPCO Co., Ltd., which has urethane acrylester as a main component. Other light-curable resins may be used as the adhesive for this purpose. A thickness of the adhesive layer 7 is preferably in a range of 1–5 µm. If the adhesive layer is thinner than 1 µm, when the thickness of the wall members is uneven, it is feared that non-adhered areas are created after the bonding. To the contrary, if the adhesive layer is thicker than 5 µm, it is feared that, during the bonding, a part of the adhesive pushed out of the wall members 3 enters (penetrates) into the ink passages 5, thus reducing the cross-sectional areas of the discharge openings and the ink passages 5. The dispersion in such cross-sectional areas depends upon an amount of the adhesive pushed out of the wall members 3, thus making the control of the cross-sectional areas of the ink passages and the like difficult. Therefore, more preferably, the thickness of the adhesive layer 7 is in a range of 1.5–3 µm.

Incidentally, the reference numeral 8 denotes first liquid droplets of a two liquid component instantaneous adhesive which is instantaneously cured by mixing a first liquid with a second liquid. These first liquid droplets are deposited on either or both of the base member 1 and the top member 2 to be bonded together, at plural points along a peripheral zone of the member. Such adhesive is preferably a two liquid component instantaneous adhesive which is not cured even if it takes a relatively long time to position the base and top members relative to each other (described later) and which can be instantaneously cured at need to minimize a waiting time (curing time, heating time and the like) to a next process or step. However, since, if adhesives of rubber group are used, it is feared that the discrepancy in the relative position between the top and base members occurs after the adhesive is cured, and if adhesives are too hard after curing, it is feared that cracking and/or separation of the adhesive occurs even due to the small shock and the like. Thus, such adhesives are not acceptable. It was found that an elastic instantaneous adhesive "PEG-α" manufactured by CEMEDINE Co., Ltd. is excellent in view of adherence and hardness.

In this process, the base member 1 having the wall member 3 and the like, and the top member 2 are overlapped as shown in FIG. 1A so that the wall members 3 and the recesses 6 of the top member 2 are opposed to each other, thereby positioning the wall members 3, wall portions 4 and the recesses 6 of the top member 2. The positioning between these portions can be ascertained by an operator's eye or any microscope.

Temporary Adhesion

In this process, the work positioned in the manner as mentioned above is temporarily adhered (temporarily bonded) to prevent the positioned members from being displaced in the subsequent processes.

That is to say, as shown in FIG. 1B, second liquid droplets 9 of the second liquid of the above-mentioned two liquid component instantaneous adhesive are applied onto the first liquid droplets 8 deposited on the work so positioned, with the result that the adhesive is instantaneously cured by mixing these liquid droplets, thus temporarily bonding the base member 1 and the top member 2 together. The second liquid may be applied or poured by using a micro-cylinder and the like. Since the height of the wall members 3 is in the order of 20–40 µm, the second liquid can quickly flow onto the first liquid by capillary phenomenon, thus curing the adhesive quickly. Incidentally, the bonding may be effected at two or more points to ensure the bonding effect.

Positioning Before Bonding

Figure 2A:
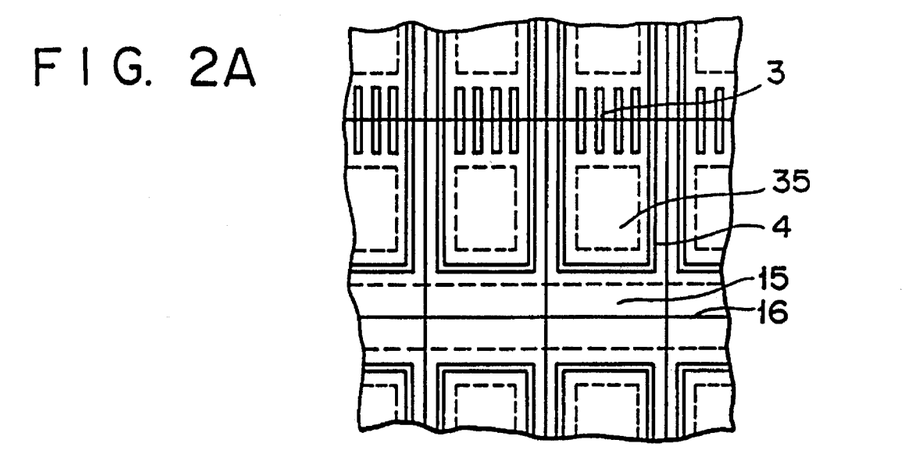
FIG. 2A is a partial view showing a condition that a pressurizing tool used in the manufacturing method of the present invention is positioned with respect to a work.
Figure 2B:
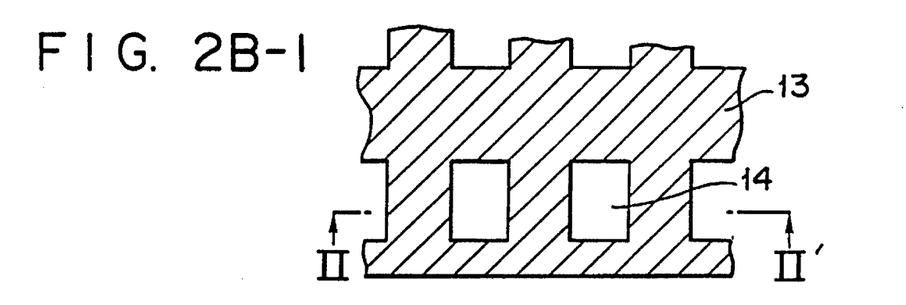
Figure 2B:
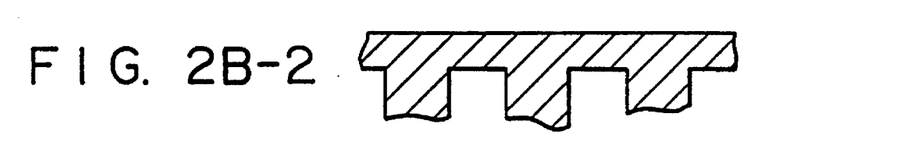

As shown in FIG. 1C, the work temporarily bonded is rested on a press platform 11 of a bonding machine, together with or without a work support 10. Then, a thin elastic film or layer 12 made of semi-transparent silicone rubber and the like is rested on the work, and further, a pressure member 13 made of UV permeable material such as quartz, glass or the like is overlapped on the elastic layer 12. Preferably, the thin elastic layer has the hardness of 40–85 degrees obtained by an A-type hardness tester of K6301 spring type, and a thickness of 0.2–1 mm. As shown in FIG. 2B, recesses 14 are formed in a lower surface of the pressure member 13 so that only the wall members 3 and the ink chamber defining wall portions 4 of the work can be pressurized substantially uniformly with the aid of the thin elastic film during the pressurizing process. FIG. 2A is a plan view showing a condition that the recesses 13 of the pressure member 13, and the wall members 3 and ink chamber defining wall portions 4 of the base member 1 are positioned with respect to each other. Incidentally, the reference numeral 15 denotes wire bonding pad portions; and 16 denotes separating lines along which the discharge unit is divided.

If there are no recesses 14, as shown in FIG. 8, the uneven bonding will frequently occur due to the deformation of the top member 36. The positioning can be effected while ascertaining the positions of the elements by the operator's eyes since the top member is transparent. However, when it is difficult to correctly position the elements because of the interposition of the thin elastic layer of silicone rubber, the positioning may be effected by abutting the work and the pressure member against an end wall of the press.

Figure 2C:
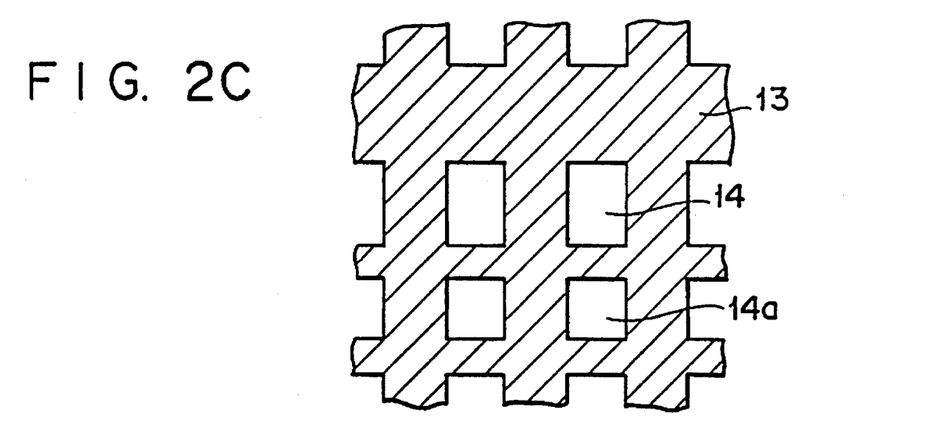

Incidentally, alternatively, the pressure member 13 may be constituted as shown in FIG. 2C. In FIG. 2C, the pressure member 13 is provided with recesses 14a corresponding to areas where the ink passages are formed, as well as the above-mentioned recesses 14 corresponding to areas where the ink chambers are formed.

Bonding

Figure 3A:
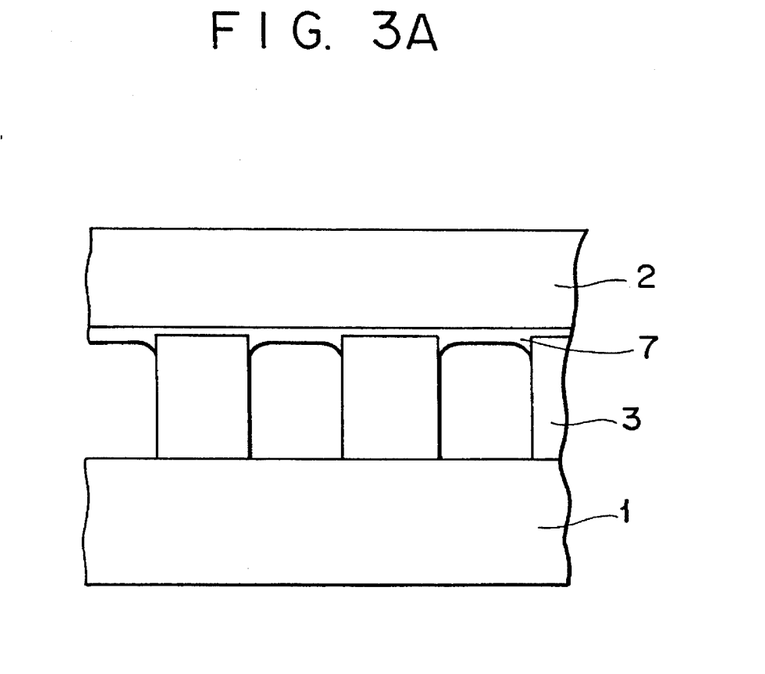
FIGS. 3A and 3B are partial sectional views showing a condition that a top member and a side wall pattern are bonded to each other.
Figure 3B:
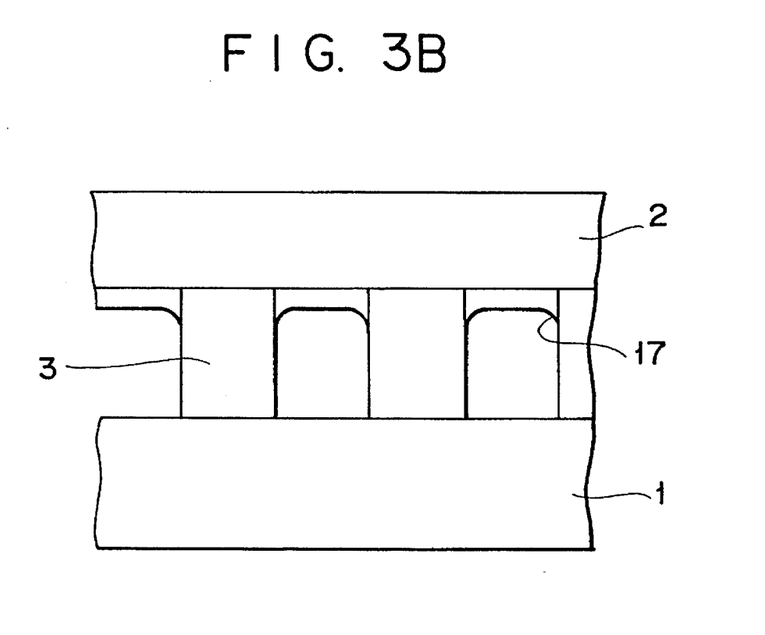

After the work and the pressure member 13 are positioned in place, the work is heated. The work may be heated by a heater incorporated into the press or by an infrared ray heater from above. The upper heater is not mandatory, but, the work can be heated from below. The heating temperature is preferably 50°–150° C., and most preferably 80°–120° C. for the adhesive of the layer 7. After the heating, the top member and the base member are bonded together by pressurizing the work in a direction shown by the arrow P in FIG. 1C. Incidentally, the heating may be effected simultaneously with the pressurizing. Further, although the pressure is varied in accordance with the heating temperature, in the above temperature range, it was found that the good bonding condition (FIG. 3A) could be obtained with the pressure of 0.5–10 kg/cm$^2$. Qualitatively, when the temperature of the adhesive layer 7 is high, the pressure may be relatively low; whereas, when the temperature of the adhesive layer is low, high pressure is required. If the temperature of the adhesive is too low, the strength of adhesion at the interface between the adhesive layer and the wall members 3 becomes weaker, thus causing the separation after the curing of the adhesive. On the other hand, if the temperature of the adhesive is too high, even when the work is pressurized with low pressure, the adhesive between the top member 2 and the wall members 3 will be all pushed out from the interfaces therebetween, with the result that there is no adhesive between the top member 2 and the wall members 3 and thus the bonding is sometimes effected only between the top member and side surfaces of the wall members. In such a case, the adhesion strength is relatively weak, and, as shown in FIG. 3B, the greater adhesive material 17 penetrates into the ink passages, thus making the discharge openings smaller and/or uneven. A temperature controller 64 can be used to control and adjust the temperature of a heater incorporated into the press platform 11.

A pressurizing mechanism 60 for performing the pressurization may be so designed that the work is pressurized from below, because an UV lamp 62 for illuminating the ultraviolet rays from above must be arranged above the press as will be described later. Further, since, when the moving parts are disposed below the work, the latter can be prevented from being smudged by dirt and the like, it is advantageous to arrange the pressurizing mechanism below the work in this respect.

UV Cure

After the bonding, the work is cooled. Such cooling can be effected by using water cool pipes (not shown) embedded in the press platform 11 shown in FIG. 1C. Since the base member and the top member are bonded together under the high temperature, when the temperature of the work is returned to the room temperature, there arises the stress between these members due to the difference in the coefficient of thermal expansion (for example, between the base member made of silicon wafer and the top member made of glass). To minimize such stress, the work is cooled to or near the room temperature before the adhesive layer 7 is cured, thus eliminating the stress due to the change in the temperature. Then, the adhesive layer 7 is cured by illuminating the ultraviolet rays thereon. The UV lamp is arranged above the work so that the ultraviolet rays can pass through the pressure member 13, thin elastic layer (silicone rubber) 12 and the top member 2 to core the adhesive layer 7. However, since the energy loss of the ultraviolet rays is great while passing through the silicone rubber and thus the large-sized UV lamp is required to cure the adhesive completely, it is desirable to solidify the adhesive to an extent that the adhesive cannot flow. After the adhesive is cured, the pressurization is released. In this way, since the adhesive is cured while being pressurized, it is possible to prevent the separation between the bonded parts and to achieve the stable bonding condition.

Lastly, after the work (the adhesive therein) is cured by heat and ultraviolet rays, the finished work (assembly) is cut along the separating lines 16 to obtain individual discharge elements. In this way, it is possible to provide an ink jet head as shown in FIG. 4.

The present invention is particularly effective to a recording head and recording apparatus for discharging ink by utilizing thermal energy, among liquid jet recording systems (ink jet recording systems).

It is preferable to employ the typical structure and the principle of structures disclosed in, for example, U.S. Pat. No. 4,723,129 and U.S. Pat. No. 4,740,796. This system can be adopted in so-called "On-Demand" type and "Continuous" type structures. In this system, an electrothermal conversion member disposed to align to a sheet or a liquid passage in which liquid (ink) is held is supplied with at least one drive signal which corresponds to information to be recorded and which enables the temperature of the electrothermal conversion member to be raised higher than a nucleate boiling point, so that thermal energy is generated in the electrothermal conversion member and film boiling is caused to take place on the surface of the recording head which is heated. As a result, bubbles can be respectively formed in liquid (ink) in response to the drive signals. Due to the enlargement and contraction of the bubble, liquid (ink) is discharged through the discharge port, so that at least one droplet is formed. In a case where the aforesaid drive signal is made to be a pulse signal, a further satisfactory effect can be obtained in that the bubble can immediately and properly be enlarged/contracted and liquid (ink) can be discharged while exhibiting excellent responsiveness. It is preferable to employ a drive signal of the pulse signal type disclosed in U.S. Pat. No. 4,463,359 and U.S. Pat. No. 4,345,262. Furthermore, in a case where conditions for determining the temperature rise ratio on the aforesaid heated surface disclosed in U.S. Pat. No. 4,313,124 are adopted, a further excellent recording operation can be performed.

In addition to the structure (a linear liquid passage or a perpendicular liquid passage) of the recording head formed by combining the discharge ports, the liquid passage and the electrothermal conversion member as disclosed in the aforesaid specifications, a structure disclosed in U.S. Pat. No. 4,558,333 and U.S. Pat. No. 4,459,600 in which the heated portion is disposed in a bent portion is included in the scope of the present invention. Furthermore, the present invention can effectively be embodied in a structure in which a common slit is made to be the discharge portion of a plurality of electrothermal conversion members and which is disclosed in Japanese Patent Appln. Laid-Open No. 59-123670 and a structure in which an opening for absorbing thermal energy pressure waves is formed to align to the discharge port and which is disclosed in Japanese Patent Appln. Laid-Open No. 59-138461.

A full line type recording head having a length which corresponds to the width of the maximum recording medium which can be recorded by the recording apparatus may be a structure capable of realizing the aforesaid length and formed by combining a plurality of recording heads as disclosed in the aforesaid specifications or a structure formed by an integrally formed recording head. The present invention will enable the aforesaid effects to be exhibited further effectively.

In addition, the present invention can also be effectively adapted to a structure having an interchangeable chip type recording head which can be electrically connected to the body of the apparatus or to which ink can be supplied from the body of the apparatus when it is mounted on the body of the apparatus or a cartridge type recording head integrally formed to the recording head.

It is preferable to additionally provide recording head recovery means and an auxiliary means of the recording apparatus according to the present invention because the effect of the present invention can further be stabilized. Specifically, an effect can be obtained in that the recording operation can be stably performed by providing a recording head capping means, a cleaning means, a pressurizing or suction means, an electrothermal conversion member of another heating device or an auxiliary heating means formed by combining the aforesaid elements and by performing a previous discharge mode in which a discharge is performed individually from the recording operation.

Furthermore, the recording mode of the recording apparatus may be a recording mode for recording only main color such as black and a structure may be that formed by integrally forming recording heads or a structure formed by combining a plurality of recording heads. The present invention can significantly effectively be adapted to an apparatus having a recording head of a plurality of colors or at least one full color head arranged to mix colors.

Although the aforesaid embodiments use liquid ink, ink which is solid at room temperature or ink which is softened at room temperature can be used. In the aforesaid ink jet apparatus, the temperature of ink is usually controlled in a range from 30° C. to 70° C. to make the viscosity of ink to be in a stable discharge range and thereby ink which is liquefied in response to a record signal supplied may be used. Furthermore, ink the temperature rise of which is prevented by positively using the temperature rise due to the thermal energy as energy for state change from the solid state to the liquid state of ink, or ink, which is solidified when it is allowed to stand in order to prevent the evaporation of ink, may be used. That is, ink which is liquefied by thermal energy such as ink liquefied by thermal energy supplied in response to the record signal and discharged as ink droplets or ink which is solidified when it reaches the recording medium can be employed in the present invention. In this case, ink may be, in the form of liquid or solid, held by a recess of a porous sheet or a through hole as disclosed in Japanese Patent Appln. Laid-Open No. 54-56847 or Japanese Patent Appln. Laid-Open No. 60-71260 and disposed to confront the electrothermal conversion member. It is most preferable that ink be discharged by the aforesaid film boiling method.

Figure 10:
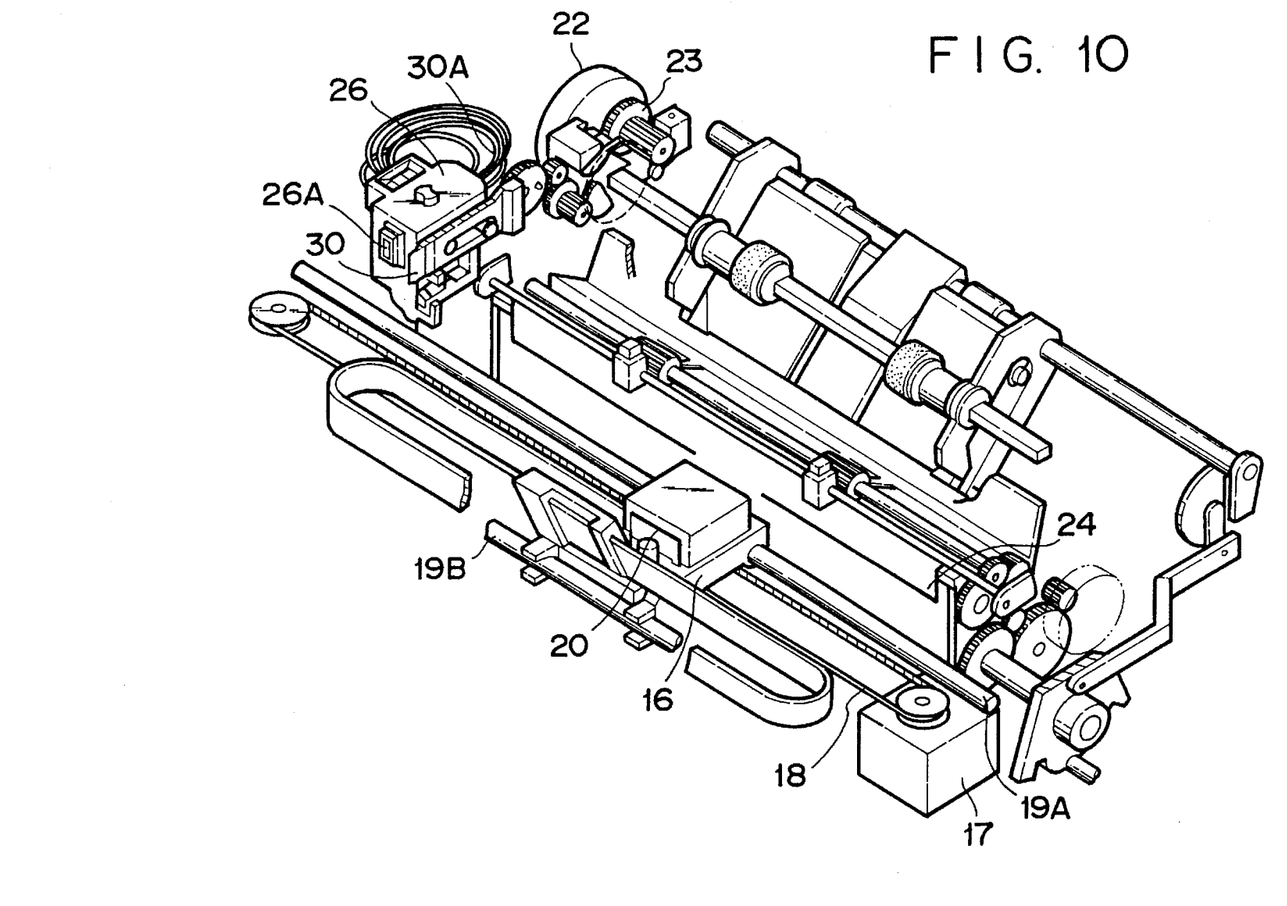
FIG. 10 is a perspective view of a recording system incorporating an ink jet head according to the present invention therein.

FIG. 10 is a perspective view showing an example of an ink jet recording apparatus (IJRA) incorporating therein a recording head obtained by the present invention as an ink jet head cartridge (IJC).

In FIG. 10, the reference numeral 20 denotes an ink jet head cartridge (IJC) having a group of nozzles for discharging ink droplets toward a recording surface of a recording sheet fed onto a platen 24. The reference numeral 27 denotes a carriage for carrying the ink jet head cartridge 20. The carriage 27 is connected to a drive belt 18 for transmitting a drive force from a drive motor 28 to the carriage and can be reciprcocally shifted across the whole width of the ink jet head cartridge 20 along two parallel guide shafts 19A, 19B.

The reference numeral 26 denotes a head recovery device disposed in the vicinity of one end of the moving path of the ink jet head cartridge 20 (for example, a home position). The head recovery device 26 is driven by a driving force of a motor 22 via transmitting mechanism 23 so that the ink jet head cartridge 20 is capped by a cap portion 26A of the head recovery device 26. In response to the capping of the ink jet head cartridge 20 by means of the cap portion, the ink is sucked by an appropriate suction means provided in the head recovery device 26 or the ink is forcibly supplied by an appropriate pressure means provided in an ink supply path, so that the ink is forcibly discharged from the discharge openings, thus removing the viscous ink from the nozzles (discharge recovery treatment). Further, after the recording operation, by capping the ink jet head cartridge 20, the latter can be protected.

The reference numeral 30 denotes a blade as a wiping member made of silicone rubber and arranged at a side of the head recovery device 26. The blade 30 is held by a blade holder 30A in a cantilevered fashion and is driven by the motor 22 and the transmitting mechanism 23 as in the case of the head recovery device 26, so that the blade can be engaged by the discharge surface of the ink jet head cartridge 20. Thus, at a proper timing during the recording operation of the ink jet head cartridge 20 or after the discharge recovery treatment of the head recovery device 26, the blade 30 is extended into the moving path of the ink jet head cartridge 20, so that the ink droplets, ink liquid and/or dirt deposited on the discharge surface of the ink jet head cartridge 20 are removed by the blade in response to the movement of the ink jet head cartridge 20.

As mentioned above, by carrying out the manufacturing method relating to the bonding according to the present invention, it is possible to obtain a plurality of heads collectively, and to bond the work stably at high production speed, without the positional discrepancy and the poor bonding.

What is claimed is:

1. A manufacturing method for an ink jet head, said method comprising the steps of:

providing a pattern for forming a wall of a flow passage communicating with a discharge opening for discharging ink therefrom and a wall of a common chamber communicating with the flow passage, on a substrate provided with an energy generating member for generating energy used for discharging the ink;

bonding a ceiling plate to the pattern formed on the substrate via an ultraviolet ray curable adhesive agent; and exposing and curing the ultraviolet ray curable adhesive while pressing the ceiling plate toward the substrate except for a portion of the ceiling plate located above the common chamber.

2. An ink jet head manufacturing method according to claim 1, wherein recessed portions are formed in a pressure member for performing pressing during said exposing and curing step, in correspondence to an area where the common chamber is formed.

3. An ink jet head manufacturing method according to claim 1, wherein pressing during said exposing and curing step is effected in a condition that a thin elastic film is interposed between a pressure member and a member to be pressurized.

4. An ink jet head manufacturing method according to claim 3, wherein said thin elastic film has a hardness of 40–85 degrees measured by an A-type hardness tester of K6301 spring type in the Japanese Industrial Standard, and a thickness of 0.2–1 mm.

5. An ink jet head manufacturing method according to claim 1, wherein the ultraviolet ray curable adhesive agent is provided as a layer having a thickness of 1–5 μm.

6. An ink jet head manufacturing method according to claim 1, wherein a pressing member for performing pressing during said exposing and curing step is permeable to ultraviolet rays.

7. An ink jet head manufacturing method according to claim 1, wherein the substrate and the ceiling plate are both plate-shaped.

8. An ink jet head manufacturing method according to claim 1 wherein in said exposing and curing step, pressing is effected while heating.

9. An ink jet head manufacturing method according to claim 1, wherein heating is effected before said pressing in said exposing and curing step.

10. An ink jet head manufacturing method according to claim 1, further including a temporary adhesion step for temporarily adhering the ceiling plate to the substrate at a plurality of points around an area where the passage is formed.

11. An ink jet head manufacturing method according to claim 1, wherein temporary adhesion step is effected by using a two liquid component elastic adhesive.

12. An ink let head manufacturing method according to claim 1, further including a cooling step for cooling at least one of the ceiling plate, the pattern, the adhesive agent and the substrate, during pressing of the ceiling plate.

13. An ink jet head manufacturing method according to claim 1, wherein the passage includes a plurality of ink paths communicating with a corresponding plurality of discharge openings, and a plurality of common chambers communicates with the plural ink paths, and wherein recessed portions are formed in an inner surface of the ceiling plate in correspondence to the common chambers.

14. An ink let head manufacturing method according to claim 13, wherein the substrate and the ceiling plate are pressed and bonded together, except for areas where the plural ink paths and common chambers are formed.

15. An ink jet head manufacturing method according to claim 13, wherein a plurality of energy generating members for generating energy used to discharge ink from the discharge openings are disposed in the respective ink paths.

16. An ink jet head manufacturing method according to claim 15, wherein the energy generating members comprise electrothermal conversion elements for generating thermal energy as the energy.

17. An ink jet head manufacturing method according to claim 1, wherein a plurality of the discharge openings are arranged along a whole width of a recording medium on which an image is formed by ink discharged from the discharge openings.

18. An ink jet head manufacturing method according to claim 1, further including a separating step for dividing the ink jet head into individual elements.

19. An ink jet head manufacturing method according to claim 1, wherein the pattern is made of photosensitive resin.

20. An ink jet head manufacturing apparatus for forming an ink jet head including a pattern for forming a wall of a flow passage communicating with a discharge opening for discharging ink therefrom and a wall of a common chamber communicating with the flow passage, the pattern being provided on a substrate having an energy generating member for generating energy used for discharging the ink, and a ceiling plate to be bonded to the pattern formed on the substrate via an ultraviolet ray curable adhesive agent, said apparatus comprising:

a pressing member for pressing the ceiling plate toward the substrate except for a portion of the ceiling plate located above the common chamber; and means for curing the ultraviolet ray curable adhesive agent by exposing the adhesive agent while pressing the ceiling plate.

21. An ink jet head manufacturing apparatus according to claim 20, wherein recessed portions are formed in said pressing member in correspondence to an area where the common chamber is formed.

22. An ink let head manufacturing apparatus according to claim 20, further including a temperature adjusting means for adjusting temperatures of the substrate and the ceiling plate via the pattern.

23. An ink jet head manufacturing apparatus according to claim 20, wherein the bonding is effected in a condition that the ultraviolet ray curable adhesive agent is interposed as a layer between the ceiling plate and the substrate, and said pressure member is permeable to ultraviolet rays, and wherein said curing means includes an ultraviolet lighting device for illuminating ultraviolet rays onto the ultraviolet ray curable adhesive agent layer.

* * * * *

UNITED STATES PATENT AND TRADEMARK OFFICE
CERTIFICATE OF CORRECTION

PATENT NO. : 5,498,306
DATED : March 12, 1996
INVENTOR(S) : Makoto SHIBATA, et al.

It is certified that error appears in the above-indentified patent and that said Letters Patent is hereby corrected as shown below:

COLUMN 4:

Line 56, "line II-II" should read --line II-II'--.

COLUMN 5:

Line 24, "embodiment" should read --an embodiment--, and "an" should be deleted;
between lines 29 and 30, the heading "Positioning" should be inserted.

COLUMN 7:

Line 1, "recesses 13" should read --recesses 14--;
Line 16, ".Incidentally," should read --Incidentally,--.

UNITED STATES PATENT AND TRADEMARK OFFICE
CERTIFICATE OF CORRECTION

PATENT NO. : 5,498,306
DATED : March 12, 1996
INVENTOR(S) : Makoto SHIBATA, et al.

It is certified that error appears in the above-indentified patent and that said Letters Patent is hereby corrected as shown below:

COLUMN 11:

Line 34, "claim 1" should read --claim 1,--;
    Line 45, "claim 1, wherein" should read --claim 10, wherein said--;
    Line 47, "let" should read --jet--.

COLUMN 12:

Line 1, "let" should read --jet--;
    Line 44, "let" should read --jet--.

Signed and Sealed this

Sixteenth Day of July, 1996

Attest:

BRUCE LEHMAN

Attesting Officer     Commissioner of Patents and Trademarks